(12) United States Patent  
Collins et al.

(10) Patent No.: US 8,244,714 B1  
(45) Date of Patent: Aug. 14, 2012

(54) ON-DEMAND DATABASE SERVICE SYSTEM, METHOD AND COMPUTER PROGRAM PRODUCT FOR GENERATING A CUSTOM REPORT UTILIZING OUTER JOINS

(75) Inventors: Jesse Collins, San Francisco, CA (US); Thomas Kim, San Francisco, CA (US); Thomas Tobin, San Francisco, CA (US); Simon Wong, San Carlos, CA (US)

(73) Assignee: salesforce, Inc., San Francisco, CA (US)

( * ) Notice: Subject to any disclaimer, the term of this patent is extended or adjusted under 35 U.S.C. 154(b) by 574 days.

(21) Appl. No.: 12/358,027

(22) Filed: Jan. 22, 2009

Related U.S. Application Data

(63) Continuation-in-part of application No. 12/175,997, filed on Jul. 18, 2008.

(60) Provisional application No. 60/950,822, filed on Jul. 19, 2007, provisional application No. 61/022,759, filed on Jan. 22, 2008.

(51) Int. Cl.  
*G06F 7/00* (2006.01)  
*G06F 17/30* (2006.01)

(52) U.S. Cl. .................. 707/714; 707/766; 707/775

(58) Field of Classification Search .................. 707/714, 707/766, 775  
See application file for complete search history.

(56) References Cited

U.S. PATENT DOCUMENTS

| | | | |
|---|---|---|---|
| 7,209,929 B2 | 4/2007 | Dominguez, Jr. et al. | 707/103 |
| 2003/0233404 A1 | 12/2003 | Hopkins | 709/203 |
| 2005/0039033 A1* | 2/2005 | Meyers et al. | 713/193 |
| 2005/0065925 A1 | 3/2005 | Weissman et al. | 707/4 |
| 2005/0223022 A1* | 10/2005 | Weissman et al. | 707/102 |
| 2005/0283478 A1 | 12/2005 | Choi et al. | 707/9 |
| 2006/0206834 A1 | 9/2006 | Fisher et al. | 715/777 |
| 2006/0248045 A1* | 11/2006 | Toledano et al. | 707/2 |
| 2007/0233642 A1* | 10/2007 | Pahno | 707/2 |

OTHER PUBLICATIONS

U.S. Appl. No. 60/828,192, filed Oct. 4, 2006.  
U.S. Appl. No. 10/817,161, filed Apr. 2, 2004.

\* cited by examiner

*Primary Examiner* — Fred I Ehichioya  
*Assistant Examiner* — Kris Mackes  
(74) *Attorney, Agent, or Firm* — Haynes Beffel & Wolfeld LLP; Ernest J. Beffel, Jr.

(57) ABSTRACT

In accordance with embodiments, there are provided mechanisms and methods for generating a custom report using outer joins in the context of an on-demand database service. These mechanisms and methods for generating an on-demand database service custom report can enable embodiments to generate reports that reflect a relationship between at least two different objects. The ability of embodiments to provide such additional insight into database contents may lead to more efficient and effective reporting.

20 Claims, 14 Drawing Sheets

ON-DEMAND DATABASE SERVICE SYSTEM, METHOD AND COMPUTER PROGRAM PRODUCT FOR GENERATING A CUSTOM REPORT UTILIZING OUTER JOINS

CLAIM OF PRIORITY

This application is a continuation in part of U.S. patent application Ser. No. 12/175,997, entitled "ON-DEMAND DATABASE SERVICE SYSTEM, METHOD AND COMPUTER PROGRAM PRODUCT FOR GENERATING A CUSTOM REPORT," by Jesse Collins et al., filed Jul. 18, 2008, which claims the benefit of U.S. Provisional Patent Application 60/950,822 entitled "METHOD AND SYSTEM FOR PROVIDING A CUSTOM REPORT TYPE," by Jesse Collins et al., filed Jul. 19, 2007, the entire contents of which are incorporated herein by reference. This application further claims priority for U.S. Provisional Patent Application 61/022,759 entitled "METHOD AND SYSTEM FOR COMPREHENSIVE RECORD REPORTING," by Jesse Collins et al., filed Jan. 22, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to generating reports for contents of such database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to report on the contents of such database systems. To date, such reporting has been limited to reporting on single database objects, etc. Unfortunately, such limitations severely inhibit the ability of the user to gain insight into the contents of the database.

BRIEF SUMMARY

In accordance with embodiments, there are provided mechanisms and methods for generating a custom report using outer joins in the context of an on-demand database service. These mechanisms and methods for generating an on-demand database service custom report can enable embodiments to generate reports that reflect a relationship between at least two different objects. The ability of embodiments to provide such additional insight into database contents may lead to more efficient and effective reporting.

In an embodiment and by way of example, a method is provided for generating a custom report using an on-demand database service. In use, a request for a report on database contents of an on-demand database service is received. It is determined whether the request to make a report requires performing an outer join. If it is determined that the request requires performing the outer join, a first query is performed for first information stored in a database, a second query is performed for second information stored in the database, the second query being based, at least in part, on a result of the first query, and the first information and the second information are compiled to produce an outer join result. Furthermore, the report is generated including at least the outer join result. Still yet, the report is output.

While the present invention is described with reference to an embodiment in which techniques for generating a custom report using an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 2C shows an interface for selecting a primary object or a focus of a custom report type, in accordance with one embodiment.

FIG. 2E shows an interface summarizing information for a report type during the custom report type creation process, in accordance with one embodiment.

FIG. 2H shows an interface for defining filters, in accordance with one embodiment.

DETAILED DESCRIPTION

General Overview

Systems and methods are provided for generating a custom report using an on-demand database service.

To date, database reporting has been limited to reporting on single database objects or based on certain predefined and fixed combinations of two or more related database objects, etc. Unfortunately, such limitations severely inhibit the ability of the user to gain insight into the contents of the database. Thus, mechanisms and methods are provided herein for generating an on-demand database service custom report and can enable embodiments to generate reports that reflect arbitrary relationships between two or more related objects determined by users of the system at runtime. The ability of embodiments to provide such additional insight into database contents may lead to more efficient and effective reporting.

Next, mechanisms and methods for generating a custom report using an on-demand database service will be described with reference to exemplary embodiments.

Figure 1:
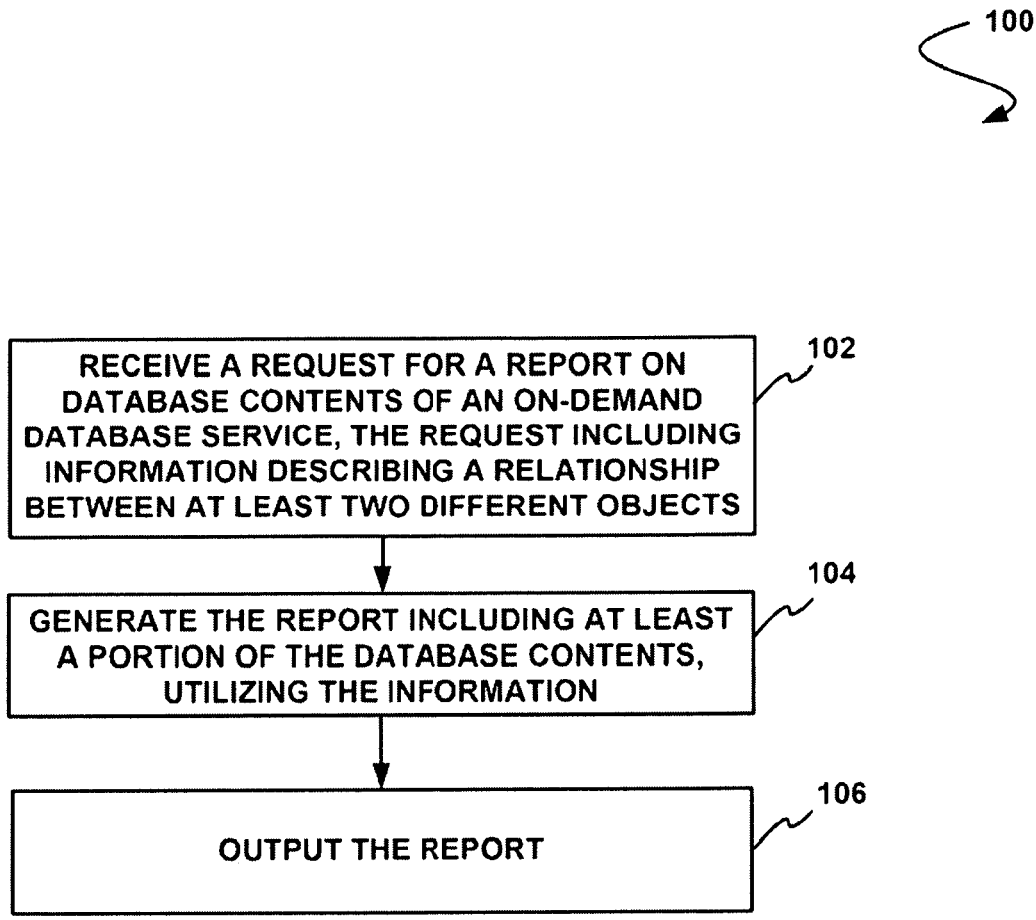
FIG. 1 shows a method for generating a custom report using an on-demand database service, in accordance with one embodiment.

FIG. 1 shows a method 100 for generating a custom report using an on-demand database service, in accordance with one embodiment. As shown, a request for a report on database contents of an on-demand database service is received. See operation 102.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Further, the request includes information describing a relationship between at least two different objects. In the context of the present description, objects may refer to any object including data such as data in a table, entire data tables, portions of data tables, rows or columns of a data table, headers of a data table, etc. As an option, the objects may include business information (e.g. account information, customer information, etc.) stored in a table.

In one embodiment, at least one of the objects may include a custom object. In this case, the custom object may be an object generated by a user. In another embodiment, at least one of the objects may include a standard object. For example, the standard object may include standard information provided by a database service.

Once the request for the report is received, the report, including at least a portion of the database contents, is generated utilizing the information. See operation 104. Furthermore, the report is output. See operation 106.

As an option, the information describing the relationship between the at least two different objects may also be stored. In this case, the information may be stored in memory and/or a specific instance of the on-demand database. In various embodiments, the information may be stored in a report template, a list, a table, or in various other formats. In this way, the stored information may then be accessible for additional use.

For example, with a report template, the report may be generated again with an updated version of the database contents, utilizing the stored information. In this case, the stored information may be linked to, or associated with an identifier. Thus, the identifier may be used to access the stored data.

For instance, if the information is stored as a report template, an identifier for the report template may be received. This identifier may then be used to lookup or access the information. It should be noted that the identifier may be any identifier used to identify the report template, such as a unique key or code, or a report template name or tag.

In addition to receiving a request for a report on the database contents, a request to perform an outer join on the database contents of the on-demand database service may also be received. In the context of the present description, an outer join refers to a join function operating between two objects, such as two tables, using identifiers (e.g. keys, etc.) that may have missing identifiers (e.g. keys, etc.) on one side of the join. For example, for an outer join, a query may return rows present from one side of a first table, and "NULL" for any empty cells in missing rows from another second table without corresponding data.

Using an outer join, join results may be returned when the named join-side matches. In various embodiments, the outer join may include a left outer join (e.g. where lines may be returned if there are no lines on the right side of the join), a right outer join (e.g. where lines may be returned if there are no lines on the left side of the join), and a full outer join (e.g. where lines may be returned from either side, whether or not there are matching lines on the other side).

In response to the request to perform the outer join, the outer join may be performed. In this case, the outer join may be performed on at least two tables of the database contents of the on-demand database service. As an option, the request to perform the outer join may include one or more conditions defining the outer join for use in performing the outer join. In this case, the one or more conditions may include a type of outer join (e.g. a left outer join, a right outer join, a full outer join, etc.), various filter criteria (e.g. object filtering, etc.), an existence of data, and/or other standard or customized conditions.

Once the outer join is performed on the at least two tables of the database contents of the on-demand database service, at least some of the results of the outer join may be included in the report. In this case, the report may include a plurality of rows present in at least a first one of the tables. Additionally, the report may include a null value for any cells in rows of a second one of the tables which lack data corresponding to the condition. For example, the report may include the rows present from the first table, and a null value for the empty cells in the missing rows from the side without corresponding data.

Figure 2A:
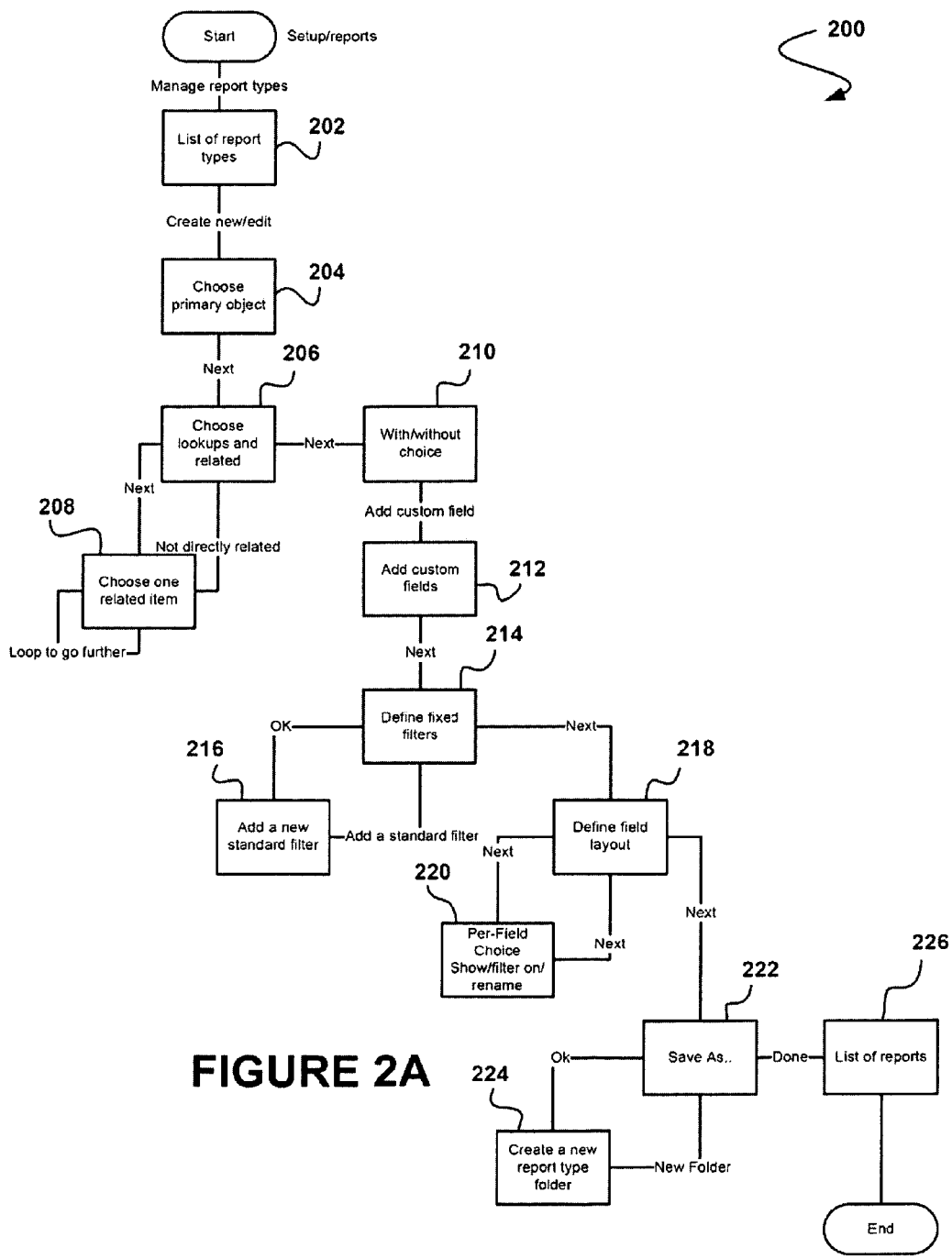
FIG. 2A shows a method for generating a custom report type using an on-demand database service, in accordance with another embodiment.

FIG. 2A shows a method 200 for generating a custom report type using an on-demand database service, in accordance with another embodiment. As an option, the present method 200 may be implemented in the context of the functionality of FIG. 1. Of course, however, the method 200 may be carried out in any desired environment. The aforementioned definitions may apply during the present description.

As shown, a custom report creation process is initiated by choosing to create a new report type. In the context of the present description, a report type may include a report template and define a set of objects that may be used in a report. The report type may also include a relationship between those objects, a set of columns enabled and set by default for a user, a definition of the columns that may be used as aggregates, and a scope of access.

For example, a setup or configuration interface may be presented to a user. In this case, the interface may display a list of report types that may be created or that are already in existence. See operation 202. Furthermore, the interface may include an option to create a new report type.

Figure 2B:
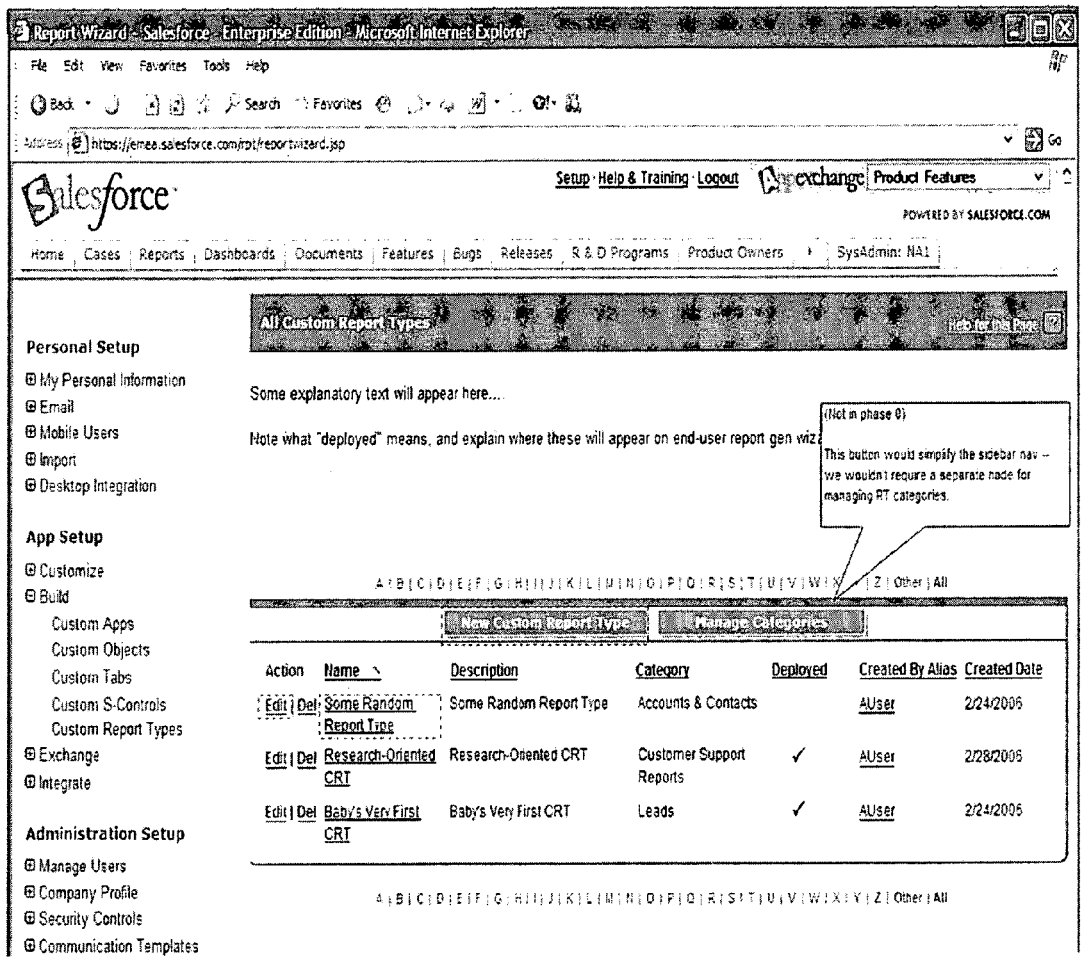
FIG. 2B shows an interface for initiating the creation of a new report type, in accordance with one embodiment.

FIG. 2B shows an interface for initiating the creation of a new report type, in accordance with one embodiment.

Using the interface, the user may choose to create or edit a report type. As a result, the user may be presented with an option to choose a primary object around which the report may run. See operation 204. For example, in one embodiment, the user may choose the primary object to be "Accounts" or "Patents." As an option, the user may choose the primary object using an interface. In one embodiment, the interface may be presented to the user upon selecting a button to create or edit a report type.

Figure 2C:
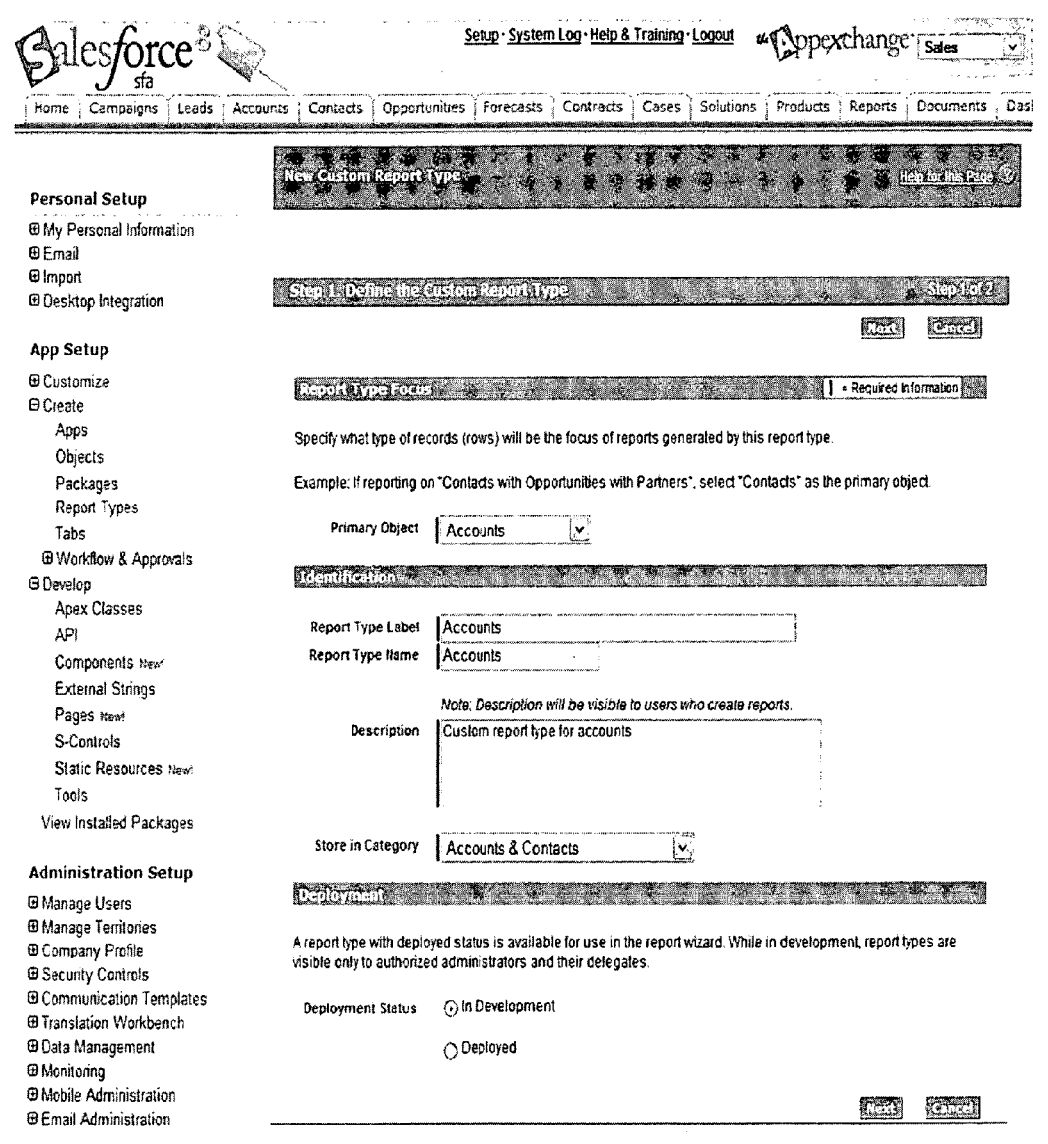

FIG. 2C shows an interface for selecting a primary object or a focus of a custom report type, in accordance with one embodiment. As an option, the user may also use the interface to name the report type.

Once the user chooses a primary object, the user may choose lookups and related child objects for the custom report. See operation 206-208. For example, in the case that the focus of the current report type (i.e. the primary object) is "Accounts," the user may chose "Contacts," "Assets," and/or "Offices" as child objects. For instance, the user may choose to add items such as data tables or portions of data tables.

Additionally, relationships between objects may be defined. For example, a user may define that every first record must have a related second record and each second record must have a related third record. Furthermore, the user may specify whether to implement inner and/or outer joins. In this case, inner joins refer to a database join where the join condition may be met to return any data. Furthermore, as shown in operation 210, "With" relationships refer to representations of database inner joins and "Without" relationships refer to representations of database outer joins. In this way, a report record set may be defined.

Figure 2D:
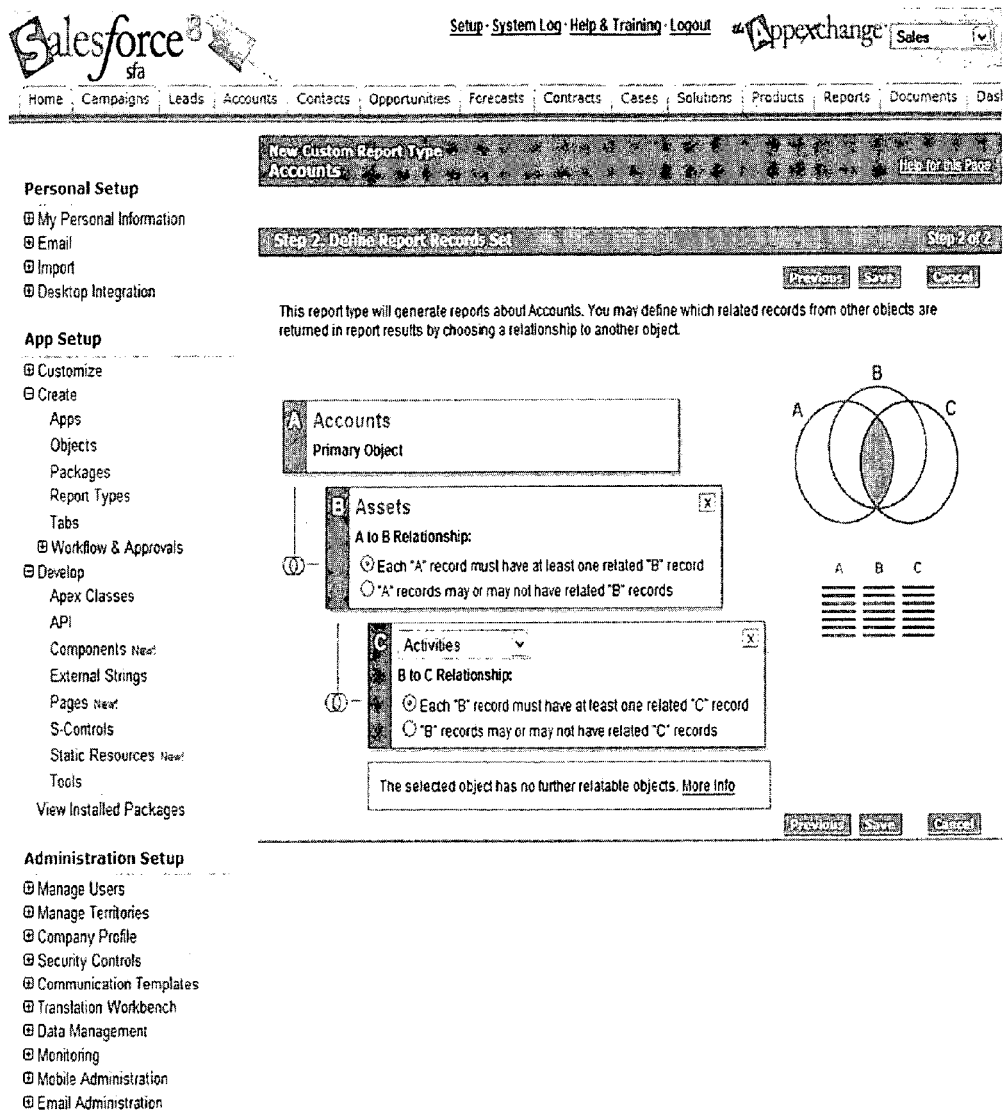
FIG. 2D shows an interface for choosing related child objects, and defining object relationships, in accordance with one embodiment.
Figure 2E:
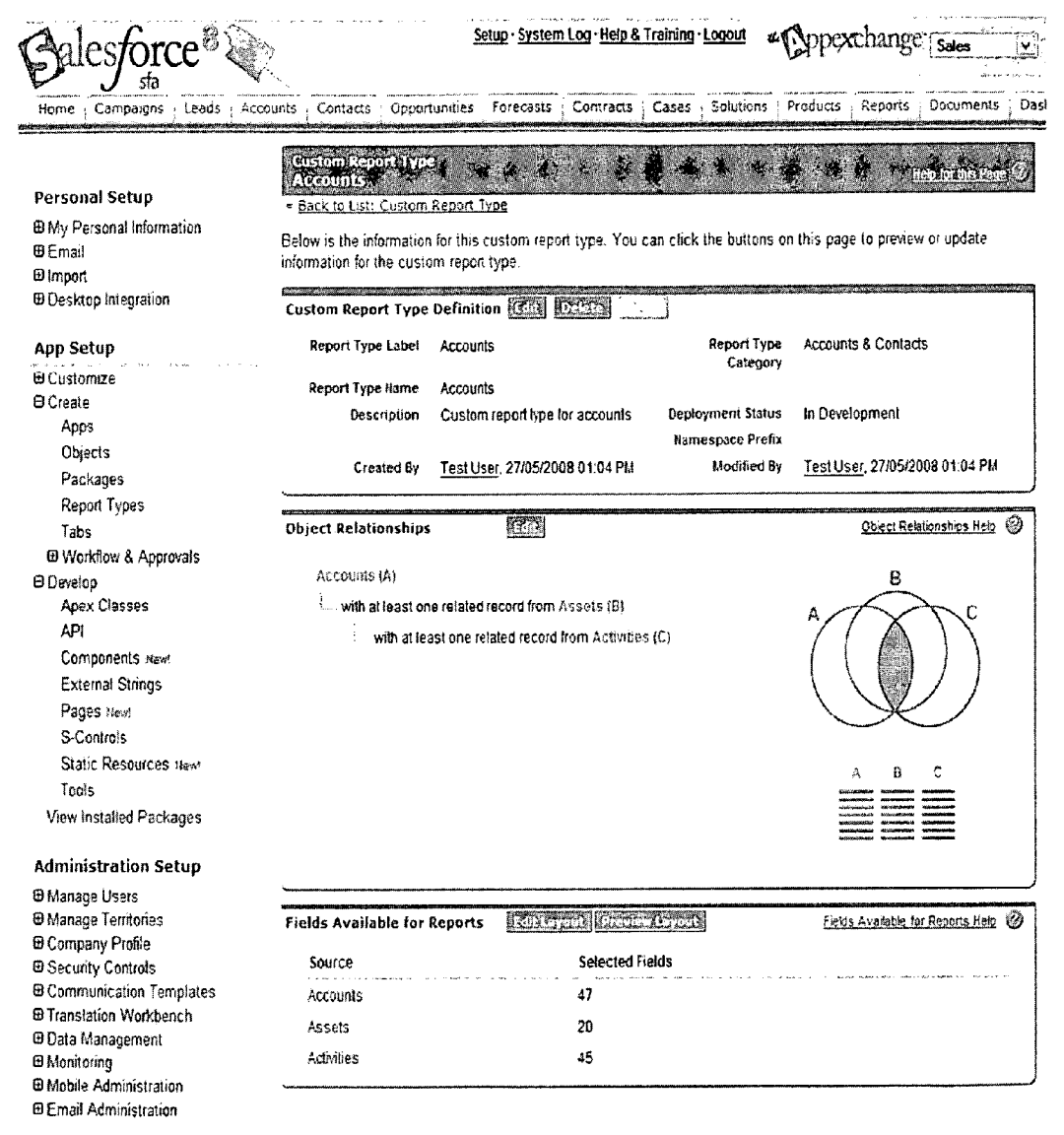

FIG. 2D shows an interface for choosing related child objects, and defining object relationships, in accordance with one embodiment. FIG. 2E shows an interface summarizing information for a report type during the custom report type creation process, in accordance with one embodiment.

Once the user has defined object relationships, the user may add custom fields, define filters, and define a layout of the custom report. See operations 212-220. For example, the user may add custom fields by selecting from a plurality of fields displayed on an interface, such as "Account Name," "Account Number," "Account Owner," etc.

Figure 2F:
FIG. 2F shows an interface for adding custom fields to a report type, in accordance with one embodiment.

FIG. 2F shows an interface for adding custom fields to a report type, in accordance with one embodiment. As an option, the user may be presented with a list of fields that the user may select (e.g. using a drag and drop technique, select box, etc.) to add to the report type. Additionally, the user may use the interface to define an arrangement of the fields on the report. For example, the user may group fields into sections to be displayed on the report.

Figure 2G:
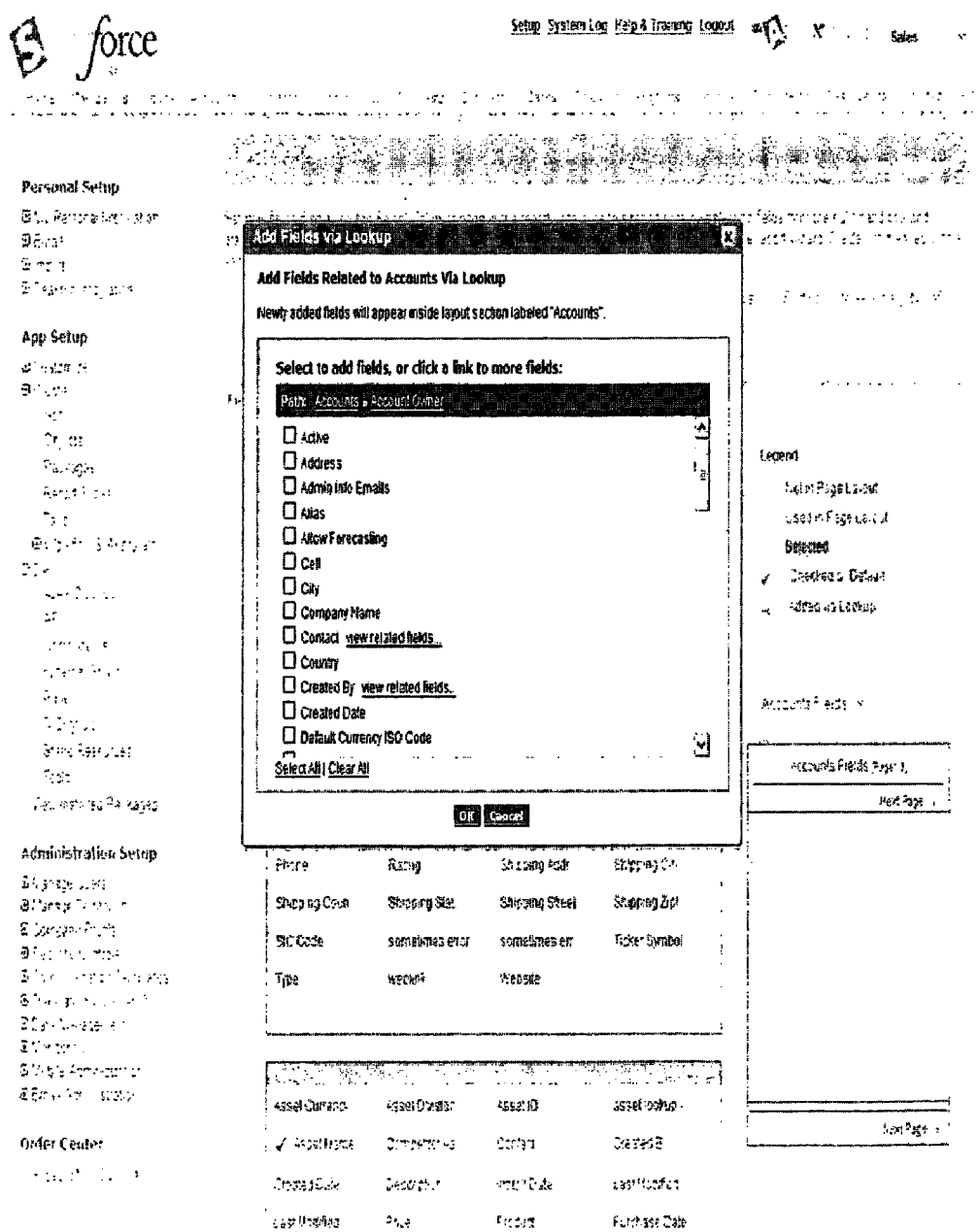
FIG. 2G shows an interface for adding fields using a lookup relationship, in accordance with one embodiment.

FIG. 2G shows an interface for adding fields using a lookup relationship, in accordance with one embodiment. Using this interface, the user may have the option to view all of the fields related to the primary object in a list format such that the user may select the field and add it to the report type. As another option, the user may have the ability to change names or labels on items and/or objects.

Figure 2H:
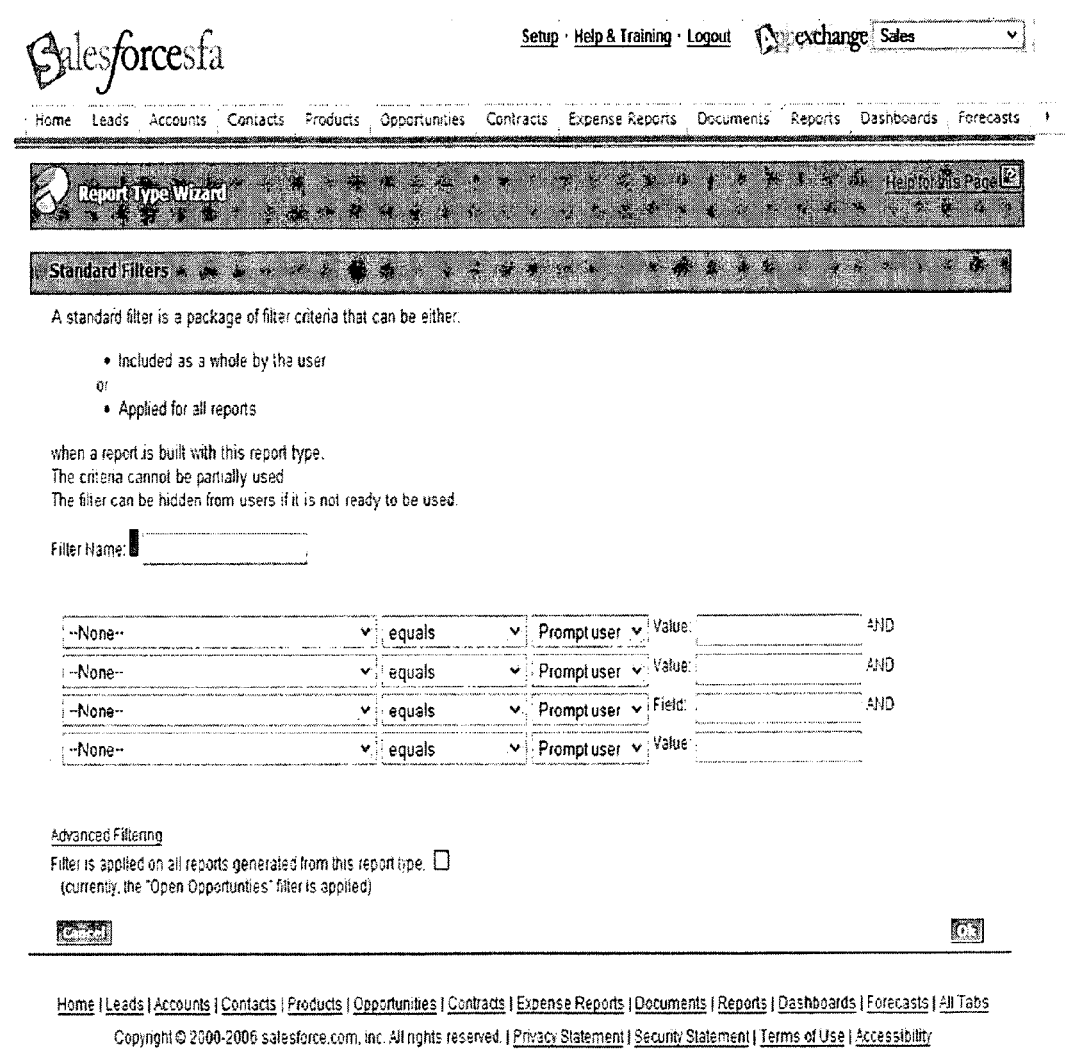

FIG. 2H shows an interface for defining filters, in accordance with one embodiment. Using such an interface, the user may be able to implement standard and customized filters. The user may also choose to make the filter present on all reports created for a report type.

Once the user has added the fields, defined the filters, and defined the field layout of the custom report type, the user may save the report type as a report template. See operation 222. As an option, the user may create a new report type folder. See operation 224. Once the report type has been saved, the report type (i.e. a report template) is added to a list of reports. See operation 226.

Figure 3A:
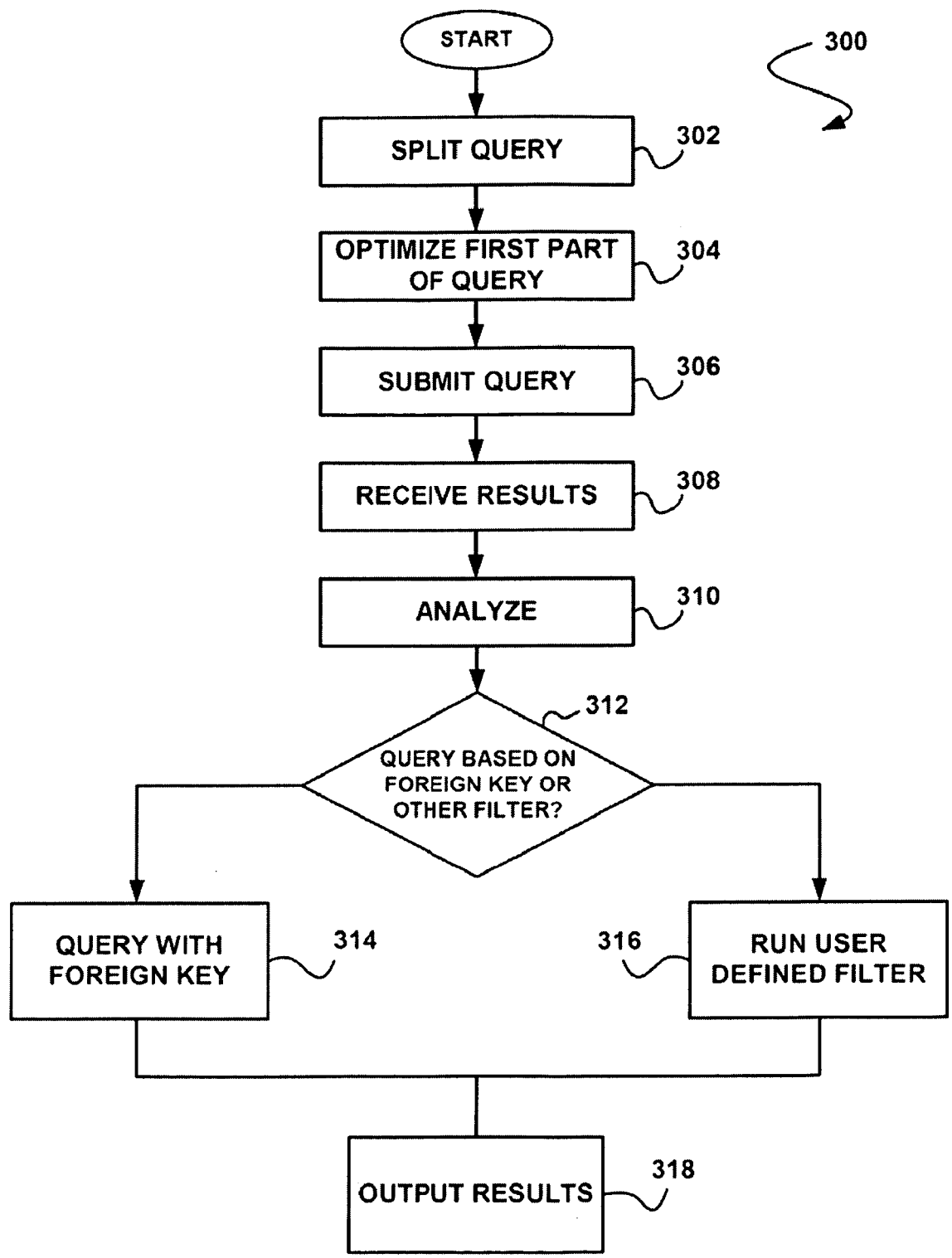
FIG. 3A shows a method for generating a custom report using an on-demand database service, in accordance with another embodiment.

FIG. 3A shows a method 300 for generating a custom report using an on-demand database service, in accordance with another embodiment. As an option, the present method 300 may be implemented in the context of the functionality of FIGS. 1-2. Of course, however, the method 300 may be carried out in any desired environment. Again, the aforementioned definitions may apply during the present description.

As shown, a query, which represents a request to perform an outer join on at least two tables, is split. See operation 302. Subsequently, a first part of the query is optimized against a first (e.g. leading) table to be joined. See operation 304.

In this case, the optimization may include applying a filter to the first part of the query. The query is then submitted. See operation 306.

The query is then processed and the results of the query are received. See operation 308. In this case, the results may include a set of foreign keys to a second (e.g. outer) table to be joined. These results are then analyzed. See operation 310. Based on the set of foreign keys, it is then determined whether to query the second table to be joined based on the foreign keys obtained from the optimization of the first part of the query, or based on another user provided filter on the second table, which may be more selective. See operation 312.

In this case, the foreign keys may include any identifiers associated with the second table that are stored in the first table. For example, the second table may be an "Account" table including a task identifier which is the foreign key in the first table If it is determined that the query is based on the foreign keys, the second table is queried using the foreign keys. See operation 314. If it is determined that the query is based on the user defined filter, the second table is queried using the other filter. See operation 316.

In this way, queries using a large set of foreign keys may be avoided by using user define filter criteria to query the second table. Furthermore, the queries may be run against the indexes of the tables to estimate a size of the output. For example, the request to perform the outer join may include a plurality of keys to indexes of the second table. It may then be determined whether to use the keys to query the second table or to use a user defined filter to query the second table. Thus, the decision may be based on the number of the keys. In other words, if there are a large number of keys, the user defined filter may be user to minimize the processing burden.

The results of the query are then output. See operation 318. In one embodiment, a first number of rows of a table may only need to be displayed. Thus, not all of the foreign key values need to be determined. In this case, the request to perform the outer join on the table may include a plurality of keys that are a subset of a larger number of keys, the subset of keys corresponding to information of the report to be output or displayed. Thus, lookups using the foreign keys may be performed in batches based on data that is to be displayed.

Figure 3B:
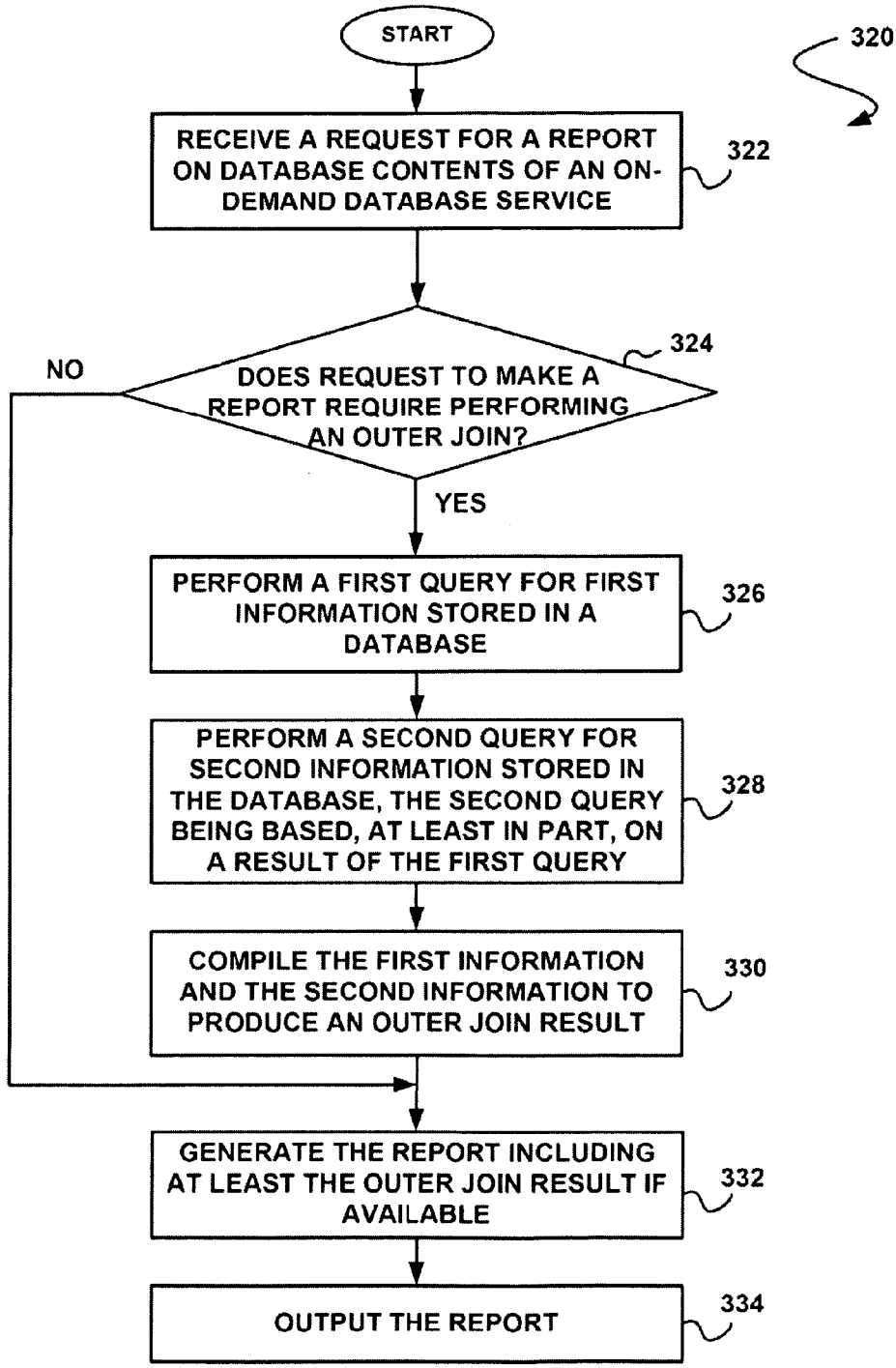
FIG. 3B shows a method for generating a custom report with outer joins using an on-demand database service, in accordance with another embodiment.

FIG. 3B shows a method 320 for generating a custom report, using outer joins, with an on-demand database service, in accordance with another embodiment. As an option, the present method 320 may be implemented in the context of the functionality of FIGS. 1-3A. Of course, however, the method 320 may be carried out in any desired environment. Additionally, the aforementioned definitions may apply during the present description.

As shown, a request for a report on database contents of an on-demand database service is received. See operation 322. It is then determined whether the request to make a report requires performing an outer join. See operation 324.

If it is determined that the request requires performing the outer join, a first query is performed for first information stored in a database. See operation 326. Additionally, a second query for second information stored in the database is performed, the second query being based, at least in part, on a result of the first query. See operation 328.

Furthermore, the first information and the second information are compiled to produce an outer join result. See operation 330. Still yet, the report is generated including at least the outer join result. See operation 332.

It should be noted that, in various embodiments, the outer join may include a left outer join (e.g. where lines may be returned if there are no lines on the right side of the join), a right outer join (e.g. where lines may be returned if there are no lines on the left side of the join), and a full outer join (e.g. where lines may be returned from either side, whether or not there are matching lines on the other side).

In the case that an outer join is not required to be performed, the report may be generated including at least a portion of the database contents, utilizing the information included in the request. In this case, the information included in the request may include information describing a relationship between at least two different objects. In one embodiment, these objects may include tables.

For example, the objects may include at least two different tables and the outer join may be performed on the at least two different tables. In this case, the report may include a plurality of rows present in at least a first one of the at least two different tables. Additionally, the report may include a null value for any cells in rows of a second one of the at least two different tables which lack data. Once the report is generated, the report is output. See operation 334.

FIG. 3O shows a method 340 for generating a custom report with outer joins using an on-demand database service, in accordance with another embodiment. As an option, the present method 340 may be implemented in the context of the functionality of FIGS. 1-3B. Of course, however, the method 340 may be carried out in any desired environment. Again, the aforementioned definitions may apply during the present description.

As shown, a first query is executed for a first object "Accounts." See operation 342. As a result of the execution (i.e. performance) of the first query, a first result set is produced. Additionally a first chunk of account IDs is fetched.

Once the first query is executed, a second query is executed for a second object "Contacts," the second query being based at least in part on the first query by specifying the fetched account IDs. See operation 344. As a result of the execution (i.e. performance) of the second query, a second result set is produced. Additionally a first chunk of contacts is fetched.

Once the second query is executed, a third query is executed for a third object "Activities," the third query being based at least in part on the second query by specifying the fetched contact IDs. See operation 346. As a result of the execution (i.e. performance) of the third query, a third result set is produced. Additionally a first chunk of activities is fetched.

Once the third query is performed, the first contact and activity chunks are joined to form complete rows. See operation 348. The activity chunk is then discarded. It should be noted that the output of the outer join is referred to as fully formed rows in this example, where the fully formed rows refer to a row containing data for Account, Contact, and Activity columns.

Chunks of data are continued to be fetched from the third query and complete row are continued to be formed until the third result set is exhausted. See operation 350. Any rows from the chunk of the second query that have not matched in any way are taken and complete rows are formed for those rows. See operation 352.

The chunk for the second query is then discarded. Chunks are fetched from the second query until the result set for the second query is exhausted. See operations 354 and 356.

Any rows from the chunk of the first query that have not matched at all are then taken and complete rows are formed from those, where all null values for the contact and activity values are filled. See operation 358. The next chunk is then fetched from the first query. See operation 360. This is continued until the result set from the first query is exhausted.

Using this technique, a depth-first-search traversal of the queries and their result sets is effectively performed. In this way, custom reports may be generated utilizing outer joins. Multiple queries may be generated and executed and the results may be merged within an application server at the on-demand database service to produce the outer-joined result set.

In one embodiment, a custom report type (CRT) definition may be created by a user and may specify one or more objects that the user wants to report on. The CRT may also specify whether the user wants inner or outer join semantics between some of the objects. In this case, the CRT definition may be received, partitioned along outer-join boundaries, and queries may be generated for each partition.

This results in N partitions with one query for each partition. In this case, the query for the second partition depends on the results from the first partition, etc. In the example set forth in the context of FIG. 3C, a report is being generated for "Accounts with or without Contacts, with or without Activities."

In that example, Accounts is the parent of Contacts, and Contacts is the parent of Activities. Conversely, Activities is the child of Contacts, which are the child of Accounts. Hence, the first query fetches account IDs, the second query fetches contacts that are the children of those account IDs, and the third query fetches activities that are the children of those contacts.

Figure 3C:
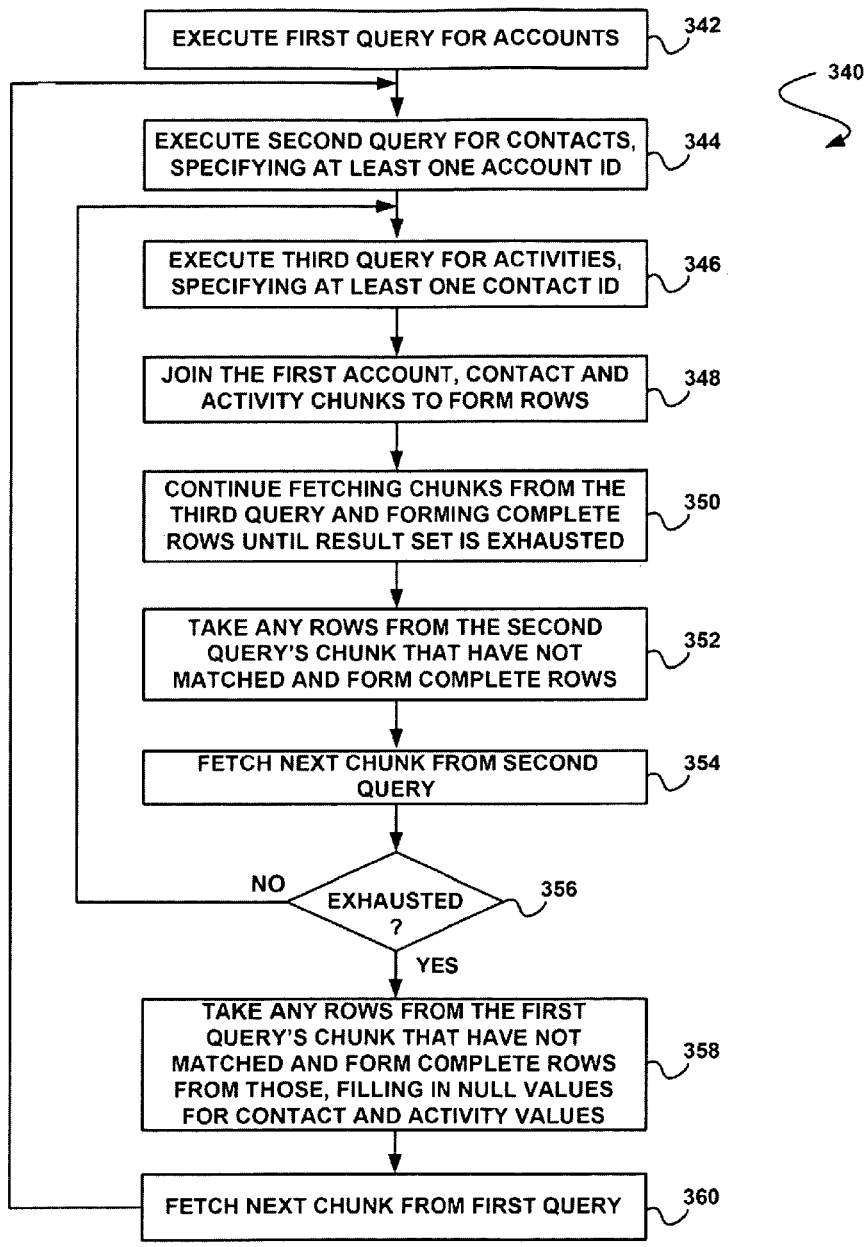
FIG. 3C shows a method for generating a custom report with outer joins using an on-demand database service, in accordance with another embodiment.

Additionally, in the example set forth in FIG. 3C, chunking was implemented to minimize the memory utilized. However, in various other embodiments, the data may not necessarily be retrieved in chunks. It should also be noted that although FIG. 3C is described in the context of accounts, contacts, and activities, any types of objects and number of objects may be utilized.

For example, a request to prepare a report may be received, at an on-demand service including custom objects. These custom objects may be any objects defined by a user (e.g. custom objects, etc.). Additionally, it may be determined whether the request to make a report requires performing an outer join on at least two tables.

If it is determined that the request to make a report requires performing an outer join on at least two tables, an outer join may be performed by applying at least one condition determined based at least in part on the request to at least two tables drawn from at least two custom objects stored by the on-demand service. Moreover, a report may be returned including rows present from at least a first table and a "NULL" for any cells in corresponding rows from a second table lacking data corresponding to the condition.

The ability to perform outer joins may allow users to build reports showing accounts regardless of whether they have contacts, opportunities regardless of whether they have products, and custom objects regardless of whether there are entries in any related list.

In one embodiment, a report wizard interface may be used to generate a report. In this case, the request to create the report may be received by a user utilizing the report wizard interface. In this case, the wizard may permit the user to specify filter criteria for creating a report. For example, a user utilizing the report creator wizard may attempt to create a Boolean filter on a set of advanced filters the user has chosen. For example, if CRT schema is A with B, with or without C, with or without D, then the user may create "(filter on A) OR ((filter on B) AND (filter on C) AND (filter on D))" or "(filter on A) AND (filter on B) (filter on A) AND (filter on C)." In one embodiment, attempts to create a Boolean filter that crosses an outer join with an OR expression may be shown as an invalid Boolean filter expression.

When the user filters on a column coming from an outer-joined object, the result may be the same as if the user was filtering on a column that contained no value, for records that exist. If there is no record, the filter may not apply. When sorting on an outer-joined column, the results may be equivalent to sorting on empty-valued cells in that the null value is the lowest value possible.

System Overview

Figure 4:
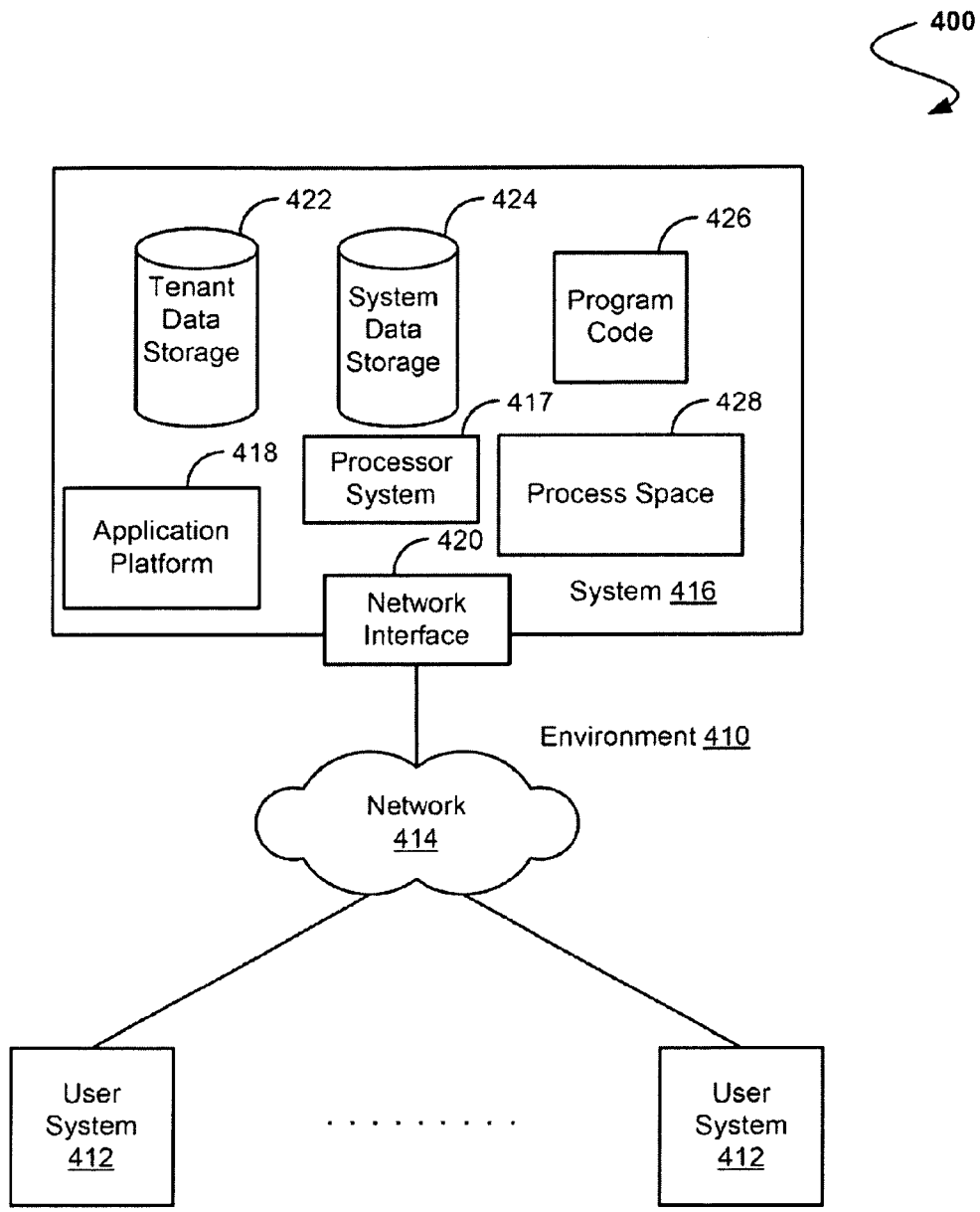
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine Or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internet-work of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
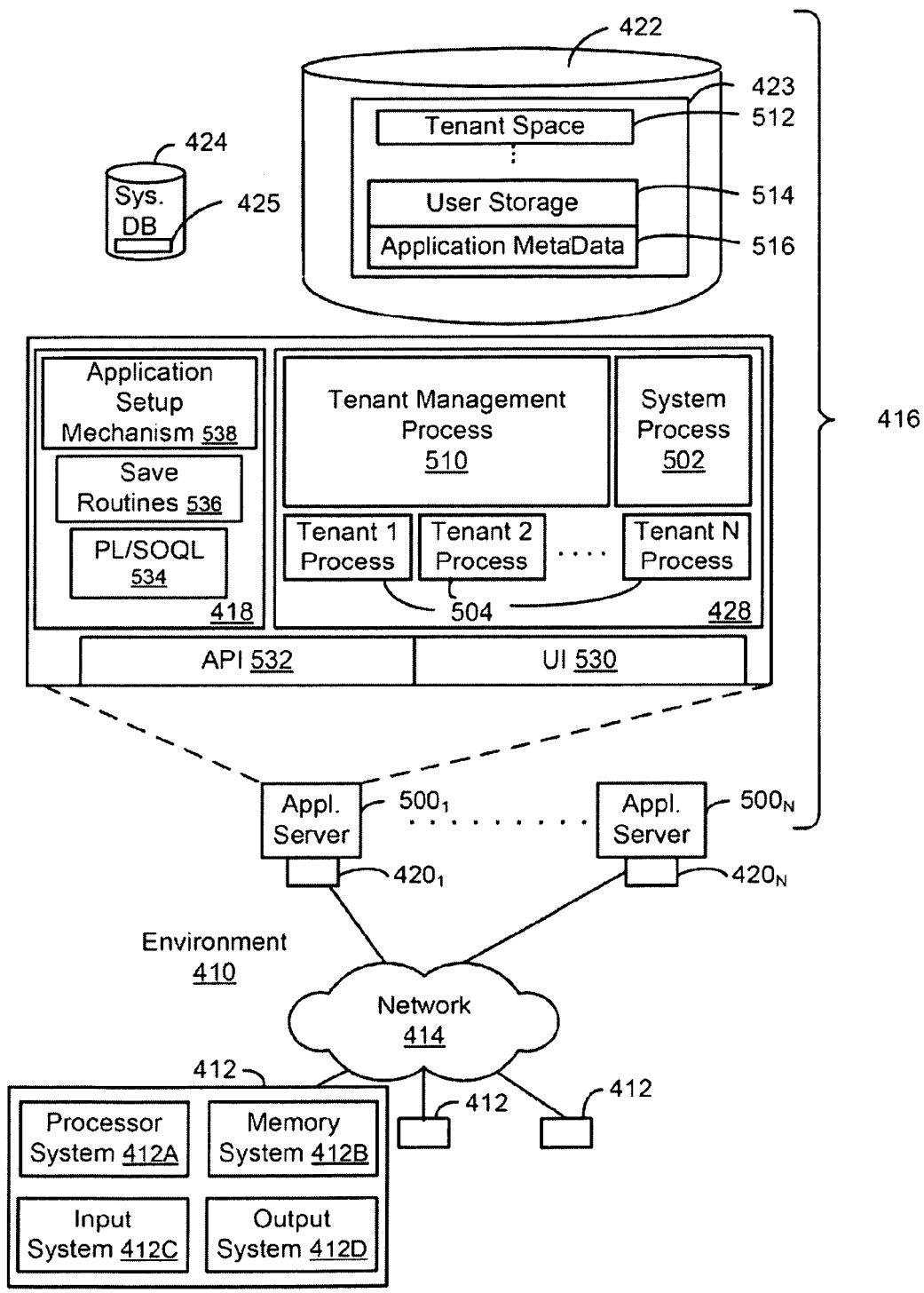
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of incrementally preparing a report that requires a join, the method including:
   an on-demand database service receiving a request from a tenant for a report on database tables in memory that requires performing a join between the database tables;
   determining a depth-first-search query sequence to implement the join that includes at least first and second queries;
   retrieving an initial chunk of objects responsive to the first query and using foreign keys in the initial chunk of objects to perform the second query, wherein a size of the initial chunk is selected to at least fill a view window and to limit how many objects are retrieved responsive to the first and second queries;
   compiling initial results of the first and second queries and generating an initial view of the report requested from the compiled initial results; and
   one or more times,
      receiving a request for further results for the report,
      retrieving a further chunk of objects responsive to the first query,
      using foreign keys in the further chunk to perform the second query,
      compiling further results of the first and second queries, and
      generating a further view of the report from the compiled further results.

2. The method of claim 1, wherein the request includes information describing a relationship between at least two different objects.

3. The method of claim 2, wherein generating the report further includes generating the report including at least a portion of the database contents, utilizing the information.

4. The method of claim 3, wherein at least one of the database objects includes a custom object.

5. The method of claim 3, and further comprising storing the information.

6. The method of claim 5, and further comprising generating the report again with an updated version of database contents, utilizing the stored information.

7. The method of claim 6, wherein the information is stored as a report template.

8. The method of claim 7, and further comprising receiving an identifier for the report template.

9. The method of claim 2, wherein the database object includes at least two different tables and an outer join is performed on the at least two different tables.

10. The method of claim 9, wherein the report includes a plurality of rows present in at least a first one of the at least two different tables.

11. The method of claim 10, wherein the report includes a null value for any cells in rows of a second one of the at least two different tables which lack data.

12. The method of claim 9, wherein the request includes a plurality of keys to indexes of a first one of the at least two different tables.

13. The method of claim 12, further comprising determining whether to use the keys to query the first one of the at least two different tables or to use a user defined filter to query the first one of the at least two different tables.

14. The method of claim 13, wherein the determining is based on a total number of the keys.

15. The method of claim 1, wherein the request includes an outer join and at least one condition defining the outer join for use in performing the outer join.

16. The method of claim 15, wherein the at least one condition includes a type of outer join.

17. The method of claim 1, wherein the on-demand database service includes a multi-tenant on-demand database service.

18. The method of claim 1, further including using a measure of objects belonging to the tenant as a proportion of total numbers of the objects in the first and second tables to determine the depth-first-search query traversal sequence to implement the join.

19. A non-transitory computer readable medium storing one or more sequences of instructions which, when executed by one or more processors, cause the one or more processors to carry out the steps of:

receiving a request from a tenant for a report on database tables in memory that requires performing a join between the database tables;

determining a depth-first-search query sequence to implement the join that includes at least first and second queries;

retrieving an initial chunk of objects responsive to the first query and using foreign keys in the initial chunk of objects to perform the second query, wherein a size of the initial chunk is selected to at least fill a view window and to limit how many objects are retrieved responsive to the first and second queries;

compiling initial results of the first and second queries and generating an initial view of the report requested from the compiled initial results; and one or more times,
 receiving a request for further results for the report,
 retrieving a further chunk of objects responsive to the first query,
 using foreign keys in the further chunk to perform the second query,
 compiling further results of the first and second queries, and
 generating a further view of the report from the compiled further results.

20. An apparatus, comprising:
a processor; and
one or more stored sequences of instructions which, when executed by the processor, cause the processor to carry out the steps of:

receiving a request from a tenant for a report on database tables in memory that requires performing a join between the database tables;

determining a depth-first-search query sequence to implement the join that includes at least first and second queries;

retrieving an initial chunk of objects responsive to the first query and using foreign keys in the initial chunk of objects to perform the second query, wherein a size of the initial chunk is selected to at least fill a view window and to limit how many objects are retrieved responsive to the first and second queries;

compiling initial results of the first and second queries and generating an initial view of the report requested from the compiled initial results; and one or more times,
 receiving a request for further results for the report,
 retrieving a further chunk of objects responsive to the first query,
 using foreign keys in the further chunk to perform the second query,
 compiling further results of the first and second queries, and
 generating a further view of the report from the compiled further results.

\* \* \* \* \*